US007761347B2

(12) United States Patent
Fujisawa et al.

(10) Patent No.: US 7,761,347 B2
(45) Date of Patent: Jul. 20, 2010

(54) METHOD AND SYSTEM FOR IDENTIFYING AND MANAGING RADIO FREQUENCY IDENTIFICATION (RF-ID) ATTACHED OBJECTS

(75) Inventors: Hiromichi Fujisawa, Tokorozawa (JP); Shojiro Asai, Tokyo (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1543 days.

(21) Appl. No.: 10/457,440

(22) Filed: Jun. 10, 2003

(65) Prior Publication Data

US 2003/0234718 A1 Dec. 25, 2003

(30) Foreign Application Priority Data

Jun. 24, 2002 (JP) ............................ P2002-182310

(51) Int. Cl.
*G06Q 10/00* (2006.01)
(52) U.S. Cl. .............................. 705/28; 705/22; 705/16; 340/10.2; 340/572.7; 235/380; 235/492
(58) Field of Classification Search .................... 705/28, 705/16, 21; 340/10.2, 5.62, 10.1; 235/492, 235/380
See application file for complete search history.

(56) References Cited

U.S. PATENT DOCUMENTS

| | | | | |
|---|---|---|---|---|
| 4,558,318 A | * | 12/1985 | Katz et al. .................. | 340/5.86 |
| 5,038,283 A | * | 8/1991 | Caveney ....................... | 705/28 |
| 6,148,245 A | * | 11/2000 | Lynch et al. ................. | 700/115 |
| 6,425,522 B1 | * | 7/2002 | Matsumoto et al. .......... | 235/380 |
| 6,448,886 B2 | * | 9/2002 | Garber et al. ............... | 340/10.1 |
| 6,963,270 B1 | * | 11/2005 | Gallagher et al. ........... | 340/10.2 |
| 7,012,531 B2 | * | 3/2006 | Fries et al. ................ | 340/572.7 |
| 2002/0007325 A1 | * | 1/2002 | Tomon ......................... | 705/28 |
| 2003/0016120 A1 | * | 1/2003 | Connolly et al. ........... | 340/5.62 |
| 2003/0216969 A1 | * | 11/2003 | Bauer et al. ................. | 705/22 |
| 2007/0239569 A1 | * | 10/2007 | Lucas et al. ................. | 705/28 |

FOREIGN PATENT DOCUMENTS

JP 2000-222534 8/2000

OTHER PUBLICATIONS

Handling Support Method and Handling Support System, pp. 1-60 and Figs. 1-23.
"Notification of Reasons for Refusal", Japan Patent Office, May 8, 2007 (w/English translation).

* cited by examiner

*Primary Examiner*—Vanel Frenel
(74) *Attorney, Agent, or Firm*—Brundidge & Stanger, P.C.

(57) ABSTRACT

The present invention discloses a method and system for making losses due to the counterfeiting of RF-ID tags to a minimum, enhancing the reliability of RF-ID tag read-out and improving the overall reliability of the RF-ID tag system. An ID reader for communicating by radio with the RF-ID tag and reading tag data from the RF-ID tag transmits the data read-out results to a terminal management server connected to the ID reader. The terminal management server decodes the error correction signal from the read-out result data, also extracts the identification number section from the tag, and decides whether or not that identification number is valid. When determined to be a valid identification number, an inquiry is made to the system operation server connected over the network to find out if that identification number was previously read out and if that identification number might be counterfeit. The system operation server then refers to the log database, the blacklist database and process transition rule, calculates the probability of counterfeiting and automatically sends a warning message to the related department when there is a high probability of counterfeiting.

10 Claims, 6 Drawing Sheets

| TAG DATA: 128 BITS ||||
|---|---|---|---|
| PHYSICAL HEADER: 8 BITS (1 BYTE) | SERVICE HEADER: 32 BITS (4 BYTES) | SERVICE DATA: 56 BITS (7 BYTES) | ERROR CORRECTING CODE (ECC): 32 BITS (4 BYTES) |

METHOD AND SYSTEM FOR IDENTIFYING AND MANAGING RADIO FREQUENCY IDENTIFICATION (RF-ID) ATTACHED OBJECTS

BACKGROUND OF THE INVENTION

The present invention relates to a method and a system for managing RE-ID identification numbers and for controlling the identification numbers used in RF-ID tags; and, more particularly, the invention relates to a method and system that are capable of keeping losses due to counterfeiting of RF-ID tags to a minimum, enhancing the reliability of RF-ID tag read-out, and improving the overall reliability of the RF-ID tag system.

In the standard method of product identification, an identification number, for example, a barcode, is printed on a paper seal and attached to objects, such as merchandise, for product control of those objects. However, in recent years, such an identification number has been stored in an electronic medium that does not have its own power source, and that medium is then attached to or embedded in an object. This electronic medium is called an RF-ID tag. An RE-ID tag of this type is extremely small, inexpensive and can also be made in large quantities. A characteristic identification number is therefore stored in the RF-ID tag for various applications, such as to verify that the object to which the RF-ID tag is attached is genuine. An RF-ID tag, for example, may be embedded within paper, such as valuable bonds or paper currency, or it may be attached to brand name products. To then verify the authenticity of that object, the identification number within the RF-ID tag is electronically scanned and correlated with a group of identification numbers that are stored in a separate database. If a matching number is contained within that group of stored identification numbers, then that number is determined to be genuine. If it is not contained within that group of stored numbers, then that number is determined to be false.

This method is effective when implemented, and, in addition, methods are known for encrypting and storing the identification number to prevent it from being scanned and copied without authorization.

However, there is a problem with the known methods, in that, if the data within the RF-ID tag is copied and counterfeited, then detecting it as a counterfeit is difficult, since the number itself is correct. Another problem is that the reliability of the data may be in doubt when the data is electronically loaded in a wireless manner. Yet another problem is that, even if encrypted, the data might be illegally decoded, because it is short.

SUMMARY OF THE INVENTION

In view of the above-mentioned problems with known methods, the present invention has an object of providing a method and system to implement a method for holding losses due to counterfeiting to a minimum. Another object of the present invention is to provide a method to improve the data reliability during loading and to make counterfeiting difficult by utilizing a randomization method.

In order to achieve the above-stated object, in implementing the method of the present invention, a system is provided which has an ID reader for reading (scanning) the RF-ID tag data sent by wireless communication, a terminal management server for controlling multiple ID readers, and a system operation server for unified control and monitoring of the multiple terminal management servers installed over a wide area. In accordance with the present invention, the system operation server contains log databases for managing all of the scanned log data; and, all past scanned information reported from a terminal management server is recorded and managed, and replies are made to queries from the terminal management server. By searching the past scanned data, it is possible to determine when, where and in what process the identical tag data was read-out (scanned), and by using all that information, the authenticity of the subject tag data of the query can be verified.

DETAILED DESCRIPTION OF THE PREFERRED EMBODIMENTS

The present invention is based on the principle of detecting the possibility of multiple existence of a unique identification number, by analyzing both the time and geographical information that is provided with an identification number that has been scanned from merchandise which carries RF-ID tags that are used in a wide area. The present invention further includes a detecting function that takes into account the time of scanning an identification number, which is to say, information which concerns the positioning of the read-out process in the processing flow. As explained in the following detailed description, the present invention also improves the reliability during data loading (read out) by using an error correcting code and a method for verifying an identification number as genuine by using pseudo random numbers.

The present invention will be described in detail with reference to an exemplary embodiment.

Figure 1:
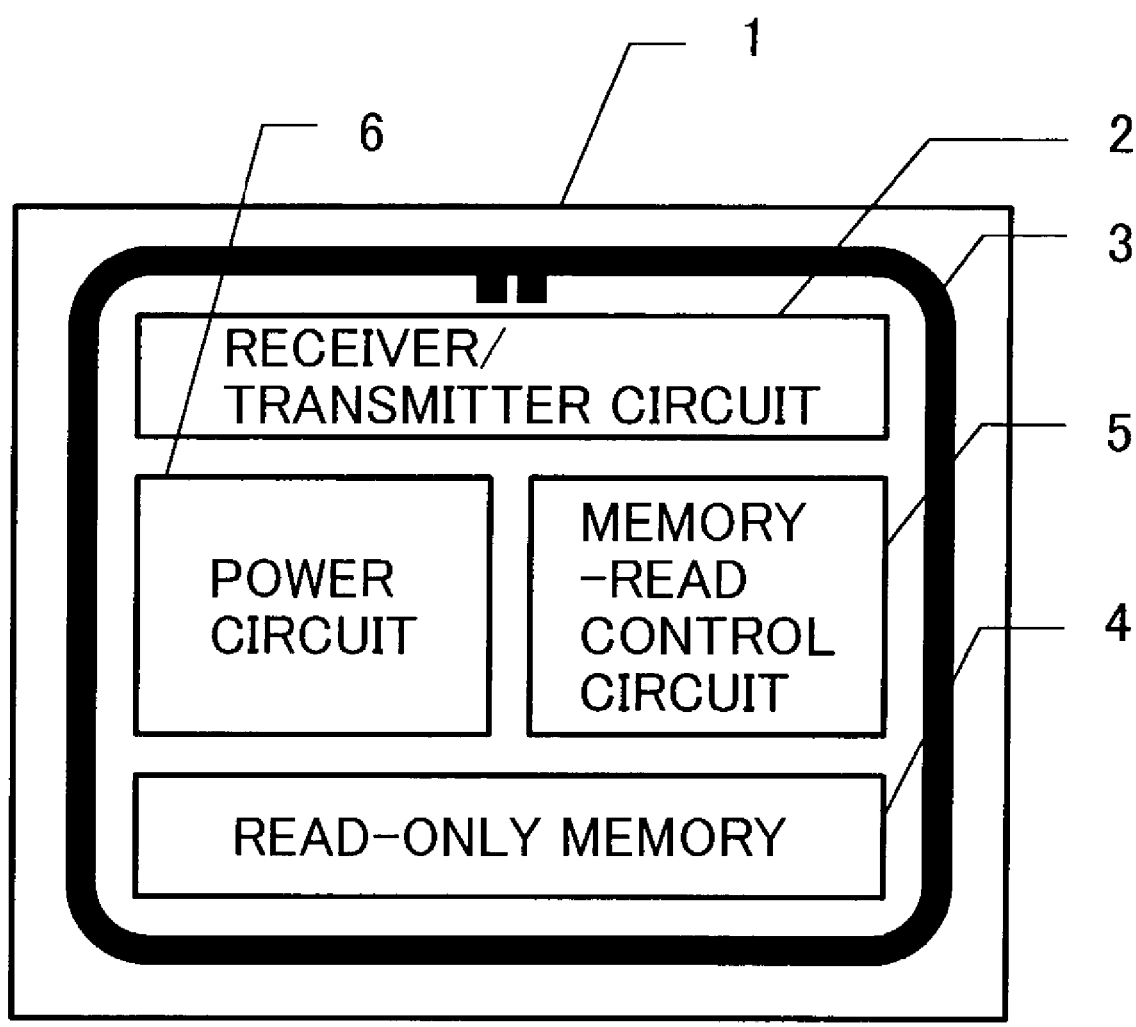
FIG. 1 is a diagram showing the structure of an RF-ID tag chip.

As shown in FIG. 1, the RF-ID tag (RFID is an abbreviation for Radio Frequency Identification) is provided as a semiconductor chip 1 comprised of an antenna 3, which is carried inside the chip, a receiver/transmitter circuit 2 for effecting radio communication with an external location, a read-only memory 4 for storing tag data, a memory read control circuit 5 for loading data from the memory 4, and a power circuit 6 for supplying power to these circuits. The chip of this embodiment is small in size, having with dimensions, for example, of 0.4 millimeters on each of the four sides and 60 micrometers thick. A feature of this type of RF-ID tag is that it obtains energy for data transmission from a (received) RF signal wave of 2.45 gigahertz. This energy operates the (RF-ID tag) circuit; and, since the RF-ID tag does not require its own power supply, it can be made compact and used anytime and anywhere. The data read from the activated RF-ID tag circuit is then transmitted over the RF carrier wave.

The chip 1 (RF-ID tag), in this way, replies to a request sent by radio from an ID-reader (to be described later) for reading data from the chip. The chip 1 then sends the data stored in the read-only memory 4 to the ID reader, so that the ID reader consequently receives the data. The distance between the ID reader and the RF tag depends on the structural design of the RF-ID tag antenna, but it may be from 1 millimeter to several dozen centimeters. A description of the actual chip is omitted, since the detailed features thereof are not elements of the present invention.

In the present embodiment, the read-only memory 4 stores 128 bit data, as will be described later, and each chip stores a different numerical value. The objective of the RF-ID tag is to provide systematic management of merchandise items to which the tag is appended, and to verify the authenticity of the merchandise items by linking or matching this unique numerical value with the merchandise item to which it is assigned.

Figures 2, 3:
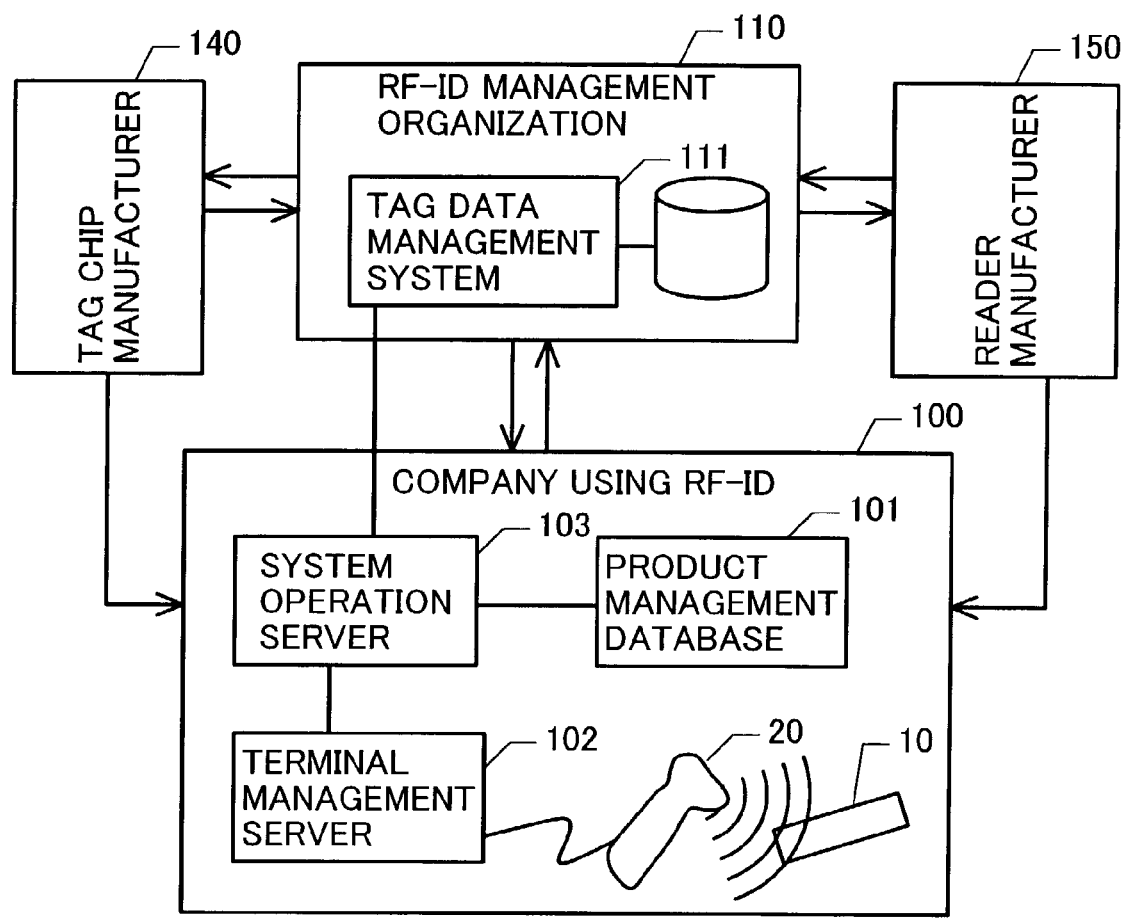
FIG. 2 is a block diagram showing a system utilizing the RF-ID tag data.
FIG. 3 is a diagram showing the structure of the RF-ID tag data.

The overall configuration of the system for utilizing the RF-ID tag will be described in detail with reference to FIG. 2.

The overall system of the present embodiment is comprised of the company 100 using the RF-ID tag, an RE-ID tag management organization 110, a tag chip manufacturer 140 and an ID-reader manufacturer 150. The company 100 wishing to use the RF-ID tags makes a request to the RF-ID tag management organization 110 that supervises the RF-ID tags and specifies the quantity of RF-ID tags and the type of service application for which they are to be used. The RF-ID tag management organization 110 commissions the manufacture of the RF-ID tag chips to the RF-ID tag chip manufacturer 140, based on the required information, and also stores (registers) all information relating to the manufacture of the RF-ID tag chips in the tag data management system 111. In that case, the RF-ID tag management organization 110 generates the data that must be stored in the RF-ID tag chips to be manufactured and sends this data to the RF-ID tag chip manufacturer 140. The manufactured RF-ID tag chips are then delivered to the RF-ID tag management organization 110 or directly to the company 100 that is to use the RF-ID tags. After receiving the supply of RF-ID tag chips, the company 100 affixes the RF-ID tags to each individual product item. The RF-ID tags might be embedded in some of the merchandise items during the merchandise manufacturing process, if the merchandise item is adaptable to such an embedding process. The data from RF-ID tags embedded in this way within the merchandise items are loaded (read out), one piece of merchandise at a time, by the ID reader 20 and stored in that company's product management database 101. In other words, a match is established between the RF-ID tag and the merchandise attributes, and then, by scanning the RF-ID tag data, the merchandise matching that data can be individually designated and the attributes and state of that merchandise can be searched for in the database. The ID reader 20 for scanning (loading) data from the RF-ID tags is designed, manufactured and supplied by the ID-reader manufacturer 150 based on a minimum of information obtained from the RF-ID tag management organization 110.

The structure of the RF-ID tag data of the present embodiment will be described next with reference to FIG. 3. In the present embodiment, the tag data is 128 bit binary (integer) data stored in the read-only memory 4. The tag data structure consists of an 8 bit physical header, a 32 bit service header, 56 bit service data, and a 32 bit error correction code (ECC), for a total of 128 bits. The physical header (1 byte) specifies the type of RF-ID tag and defines the method, generation, and manufacturing source, etc. The service header (4 bytes) is capable of specifying 40,294,960,000 (or about 40.3 billion) services or applications. In actual use, the service header is divided up into two or more sub-fields, including a service field and separate services, and it may also have the task of generation management. The number stored in the service header is referred to here as the service ID.

The 56 bit service data (7 bytes) represents an identification number for managing the merchandise. The final data, i.e., the ECC (4 bytes), consists of redundancy bits for detecting code errors in the overall tag data and for correcting a portion of the errors. For example, errors up to four bytes can be detected, or an error of up to two bytes can be corrected, by using the Reed-Solomon error correcting code. In this way, error detection and error correction are possible, even if data read-out (scanning) problems or data read-out errors are present due to various causes, such as data transmission errors during data scanning (read out). In this way, the reliability can be enhanced. The distance between the ID reader and the RF-ID tag can also be increased to a larger distance than possible without using an error correcting code, so as to make the usage more convenient.

The method of the present invention involves methods such as the service data structure method, the usage method, the management method and the authenticity verification method. The identification number affixed to the merchandise to be managed with the RF-ID tag, or a number equivalent to that identification number, is expressed by the service data. In the following description, the service data is simply called an identification number.

This identification number has the purpose of managing the merchandise as unique individual items as well as their authentication (genuine/false decision). A method is known for encrypting data by using a specified secret key to make counterfeiting difficult. However, this method is not sufficiently effective against tampering, since there are only a small number of data bits. However, the method of the present invention utilizes pseudo-random numbers to define only numbers that correspond to a 28 bit section of data (identification number) as the genuine number from among 56 bit natural numbers. Besides being able to define the identification from approximately 268,430,000 numbers, the probability of being able to counterfeit the genuine identification number from among these numbers is 1 in approximately 268,430,000, and, therefore, an extremely small probability exists.

The pseudo-random number used for this objective can be calculated by a method called the M series. Here, x (i) are non negative integers, and a, M are natural numbers in a recurrence formula;

$$x(i+1)=ax(i)+b(\mathrm{mod}\ M)$$

The number x (i+1) then becomes an integer of between 0 and M−1, including 0 and M−1. Here, the operation (mod M) is to divide (a x (i)+b) by M and to take the remainder. Then, a series of $x_0$ becomes pseudo-random numbers when the constants a, b, M are selected appropriately. It is also known that, by making b a power of 0, M a power of 2, and "a" a power of 3 or 5, when the initial value x (0) of x is made an odd number, the period of that series will be M/4. In the formula of this invention, M is the 56th power of 2. The initial value x (0) must be carefully selected. The nonlinear conversion feedback method can be utilized for the purpose of strengthening the encryption.

To manufacture the chip, the physical header value is first of all established from the tag chip architecture and generation. The service ID is next established, and the identification number series for managing the merchandise items are then generated with a pseudo-random number using the formula described above. Lastly, the error correcting code is generated. In this way, a maximum of 268,430,000 pieces of 128 bit data for the RF-ID tag are generated. The tag data management system 111 of FIG. 2 performs most of the processing. In that case, at least the initial value x (0) must be kept secret, then its security control is performed outside the tag data management system 111. The control (or management) may be performed for each service ID, and, therefore, the company 100 (planning to use the RF-ID tags) may itself control this information. When transmitting the tag data to the RF-ID tag chip manufacturer 140, the information must be encrypted to keep it secret. As another method to maintain secrecy, the device for generating the tag data may be installed as a black box at the RF-ID tag chip manufacturer 140, and the RF-ID tag management organization 110 will then encrypt and send only the required parameters.

Figure 4:
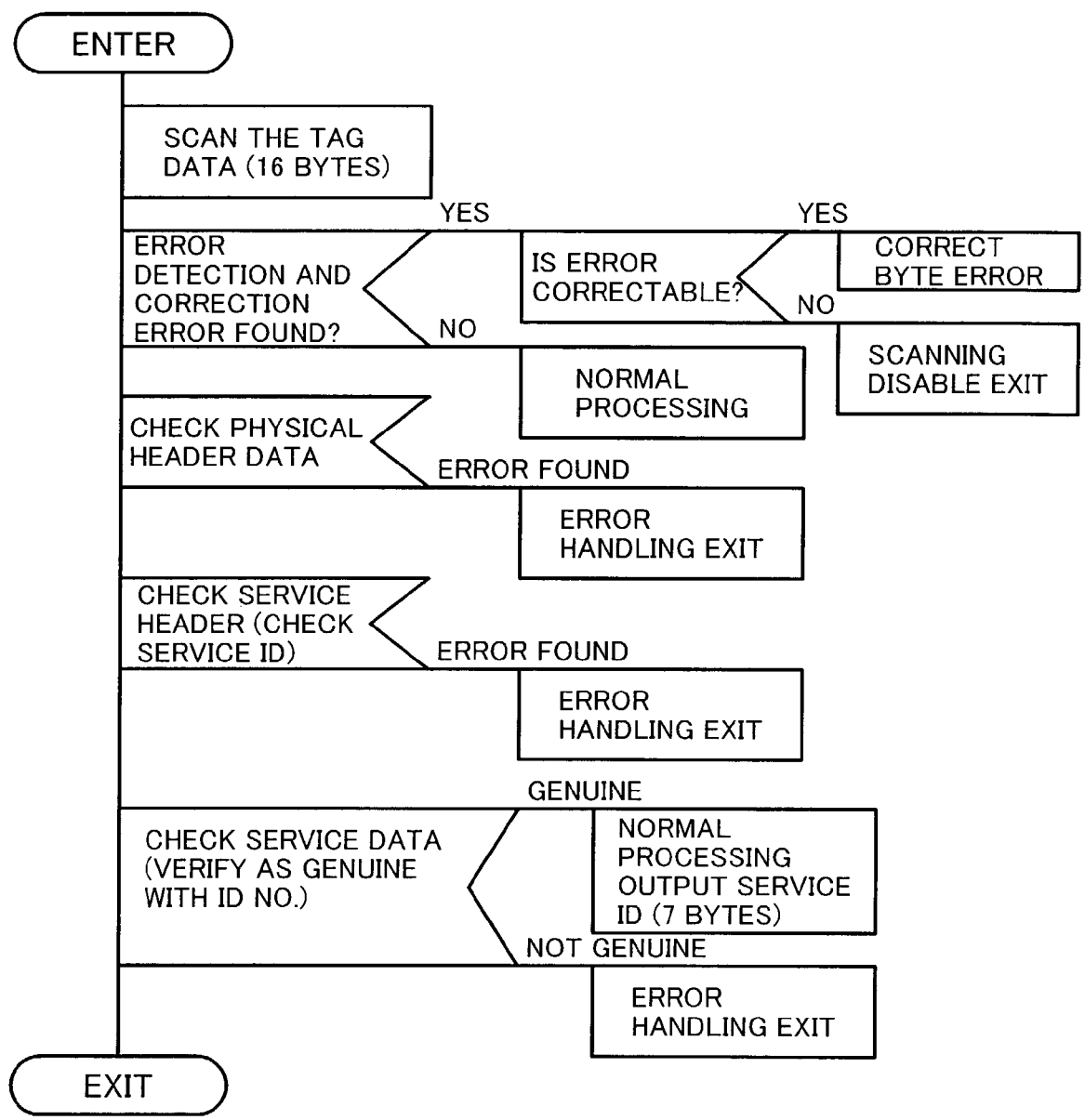
FIG. 4 is a process flow chart showing the flow of the tag data process.

The processing by the terminal management server 102 when reading out the 128 bit (16 byte) tag data from the ID-reader 20 as a signal will be described next. The process flow is shown in FIG. 4. There are two occasions when the tag data is read out; that is, the point in time when the manufactured tag chip is newly affixed to the merchandise, and the point in time, at a state transition, when the ownership of the merchandise is transferred, for example. FIG. 4 shows the latter case (transfer of ownership). The terminal management server 102 performs error detection and error correction processing on the 16 byte data, which is read as digital data from the ID reader 20 according to a specified algorithm. In other words, if an error is detected, then a decision is made as to whether correction is possible, namely whether the position of the error byte can be calculated or not. If correctable, then the error byte is corrected using the specified algorithm. If the position with the error is not correctable, then data read-out is treated as a failure, with only error detection being performed, and data read-out disable processing is implemented and the processing ends. Data read-out disable processing involves the sending of a read-out fail signal to the ID reader 20 and setting a standby state until the next data arrives. However, if no error is detected, then normal processing is performed, and the operation proceeds to the next step. Here, normal processing is the sending of a read-out okay signal to the ID reader 20.

In the next step, the physical header is decoded, and, if it is a legal value, the operation proceeds normally to the next step. If it is not a legal value, or if it is an unknown value, then error handling is performed, and the process ends. Error processing, as referred to here involves the sending of a read-out fail signal along with an error code showing the physical header error.

In the next step, the service header is analyzed and verified. The operation here assumes that an application is running and that a service ID value (might also be multiple values) has been specified beforehand. Therefore, if this value is one of the previously designated values, then it is correct; whereas, if it is none of the designated values, then that value is wrong. In the latter (incorrect) case, as part of the error handling (processing), a read-out fail signal is sent to the ID-reader 20, along with an error code showing that the service ID has an error.

In the next step, the service data (identification number) is analyzed by a method to be described later, and then it is authenticated. Basically, a decision is made as to whether or not the identification number that was read out is contained in the collection of unique identification numbers. In other words, a decision is made as to whether the number is a valid number or not. If the number is a clone that is a counterfeit of an RF-ID tag, then it might mistakenly be judged as "genuine" by this basic method. A method to eliminate this problem will be described later on. Consequently, when it is decided that the number is genuine, a code showing a correct read-out is sent along with a read-out okay signal to the ID-reader 20 as part of the normal processing. All related information, for example, the tag data from read-out and analysis, the date, the time, the ID of the reader device and the operator ID at that point in time, is recorded in the system operation server 103. Identical data is also sent to the specified (business) application process. The application process depends on the merchandise used and the business process of the company handling that merchandise. In the present embodiment, the application is one that manages the company's product management database 101, and the sales record is recorded in that database.

On the other hand, when it is judged that the number is false (non-genuine), the error handling process sends a read-out fail signal along with an error code indicating a service data error to the ID-reader 20. The service data error here is data that was correctly read out, but which also has unauthorized values and might be a counterfeit RF-ID tag. In such cases, the final processing method is determined on the basis of the policy of the company using the RF-ID tags and is not described in further detail here. Technically, however, all related information, such as the date, the time, the tag data that was read, the ID of the reader device and the operator ID at that point in time, is recorded in the system operation server 103. Therefore, the tag data that was read is determined as genuine or not on the terminal management server 102 in this way, so that this server (102) must therefore hold information relating to valid identification numbers. The method of the present embodiment for determining the validity (of the value) will be described next.

The present embodiment handles 268,435,456 (equivalent to 128 bits) identification numbers (56 bit integers as the values). Basically, identification numbers of this size should all be stored in a memory of 56 bit words, and a search must be made to find out if the ID reader data matches one of the identification numbers. However, this requires a memory of 1879 megabytes. Therefore, the method of the present invention utilizes a structure known in information retrieval technology as the TRIE structure. In other words, the identification numbers are 56 bits (seven bytes) and by handling one byte of data as 256 symbols, the following method can be employed in the same way as when making a character string search.

Figure 5:
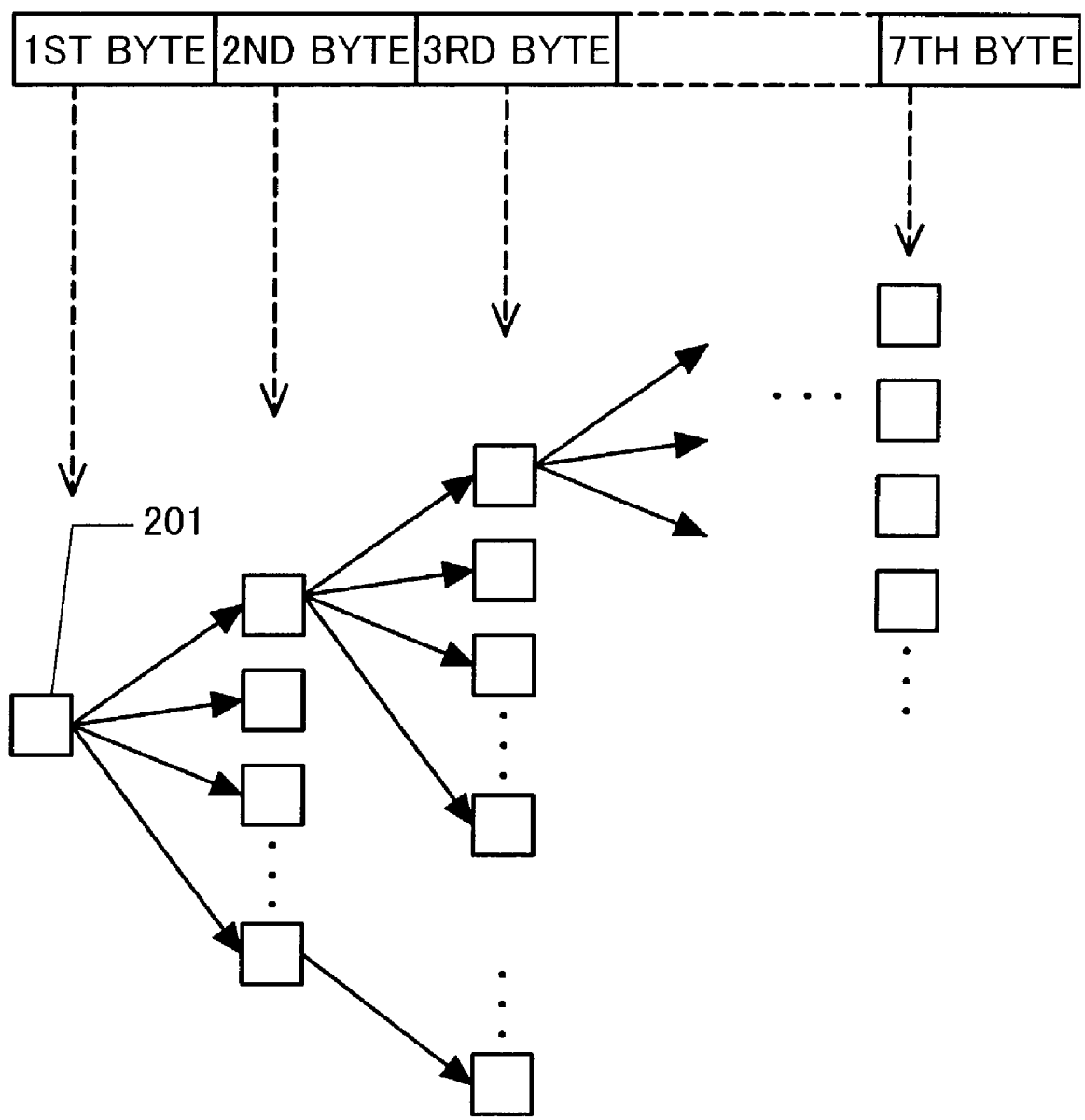
FIG. 5 is a diagram illustrating the TRIE structure.

FIG. 5 is a diagrammatic view of the TRIE structure. A TRIE structure with an average of 16 branches and 7 layers can be used to store a symbol string of seven symbols in a length of 268,435,456 elements. The average number of branch nodes is approximately 17,900,000. There are an average of 16 branches in each node, so that an average of 16 pieces of one byte data (corresponding to 16 symbols) and attached pointer information must be held. When the pointer information expresses absolute addresses throughout the entire memory space, access can be performed at an extremely high speed but a four byte pointer is required, and each node requires an average of 81 bytes (5 bytes×16+1). However, a pointer is not required in the final node layer. In this case, a memory of approximately 350 megabytes is required for all data in the TRIE structure.

Figure 6:
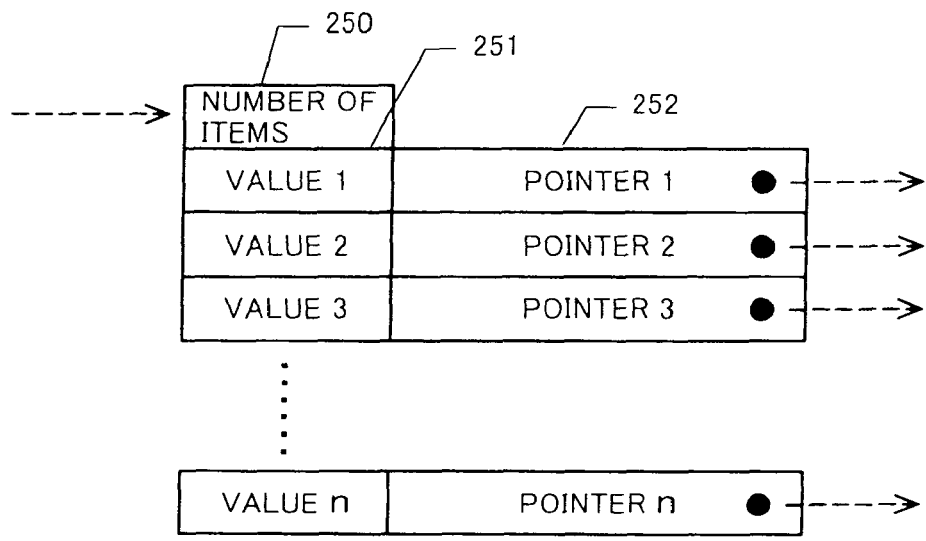
FIG. 6 is a diagram illustrating the node data structure.

FIG. 6 shows the node data structure from the first layer to the sixth layer in this case. The number of branches held by the node is stored in the one byte data 250. The following data 251 stores the byte value (average of 16 elements) for the identification number of that level, and the four byte data 252 stores the corresponding pointer. The final level is a structure with no data 252 in the seventh level node. Not all of the 268,435,456 element identification numbers are always issued when using the actual application, so that the required memory might be correspondingly smaller.

A method for storing all valid identification numbers was described above. Using this method to verify that the identification number that was read out is one of these (valid) numbers is simple. The seven byte data of the identification number is repetitively matched in sequence from the upper ranking bytes on down, as shown in FIG. 6. This process will be described using the k-th byte of data x (k), by comparing in sequence, value 1 through value n of data 251 in FIG. 6. When a match is found in this comparison process, the corresponding pointer is read, the process proceeds to the node specified by that pointer, and correlation of the x (k+1) data is performed. If a match is not found, it signifies that x (1) to x (k−1) were a match, but x (k) was not a match, and, therefore, the identification number that was read out is determined not to be a valid number.

A method for verifying whether the tag data that was read out on the ID reader was genuine in the processing by the connected terminal management server 102 has been described above. This process shows that the server (102) can verify whether the read out number is contained in the collection of valid identification numbers. However, when a number is found to be contained among the valid identification numbers, still further verification as to whether the number is genuine or not must be performed. In other words, when it is not a valid identification number, it can be judged as being a non-genuine RF-ID tag, but when it is one of the valid identification numbers, still further verification processing is required. The method for carrying out that processing will be described next.

Figure 7:
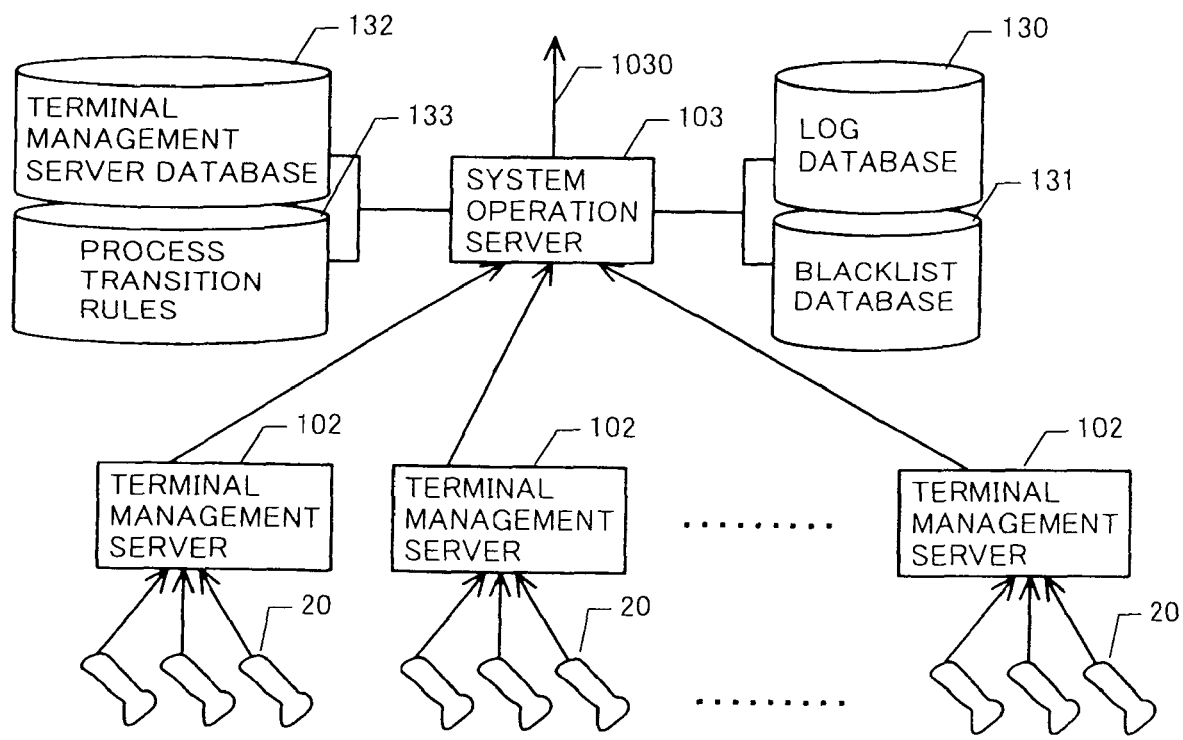
FIG. 7 is a block diagram illustrating a wide band operation management system.

The overall system will be described again with reference to FIG. 7. The system operation server 103 controls the status of the entire system and manages the multiple terminal management servers present over a wide area by way of a wide area network. The system operation server always has a log to database 130; and, as previously explained, it receives all read-out information from all terminal management servers in real time, and, along with rewriting the log database (or historical database), it also replies to queries from the terminal management servers.

Tag data, dates, times, a reader device ID, an operator ID and a process ID are stored in the log database 130. Though not previously described, the process ID is a number showing what section the process for read-out of the merchandise RF-ID tag corresponds to in the overall business system. Though depending on the application where the RF-ID tag is used, the merchandise will be monitored multiple times at different levels, so that a system is used where the ID reader also applies a process ID, and read-out results are reported to the system operation server 103 to clearly specify what levels the merchandise has passed through. The process ID, for example, defines the product inspection as 10, the factory shipment as 20, the wholesaler shipment as 30, the retailer shipment as 40, the sale as 50, merchandise return as 60, and maintenance as 70, and it can manage the merchandise item according to this life cycle. In this case, rules can be established for the likelihood of a merchandise item shifting from one process to another based on the combination of similar products. A shift from 10 to 20 for example is possible. Shifts of 20 to 30, 30 to 40, 40 to 50, 50 to 60, and 50 to 70 are also possible. How ver, a shift of 10 to 50 is not likely. Namely, a merchandise item that has only received a product inspection is not likely to have an RF-ID read-out showing a 50 (sale), so that it might have been counterfeited or stolen. When the RF-ID tags are used with paper currency, the process ID may define one process as depositing money in a bank or ATM (Automated Teller Machine) and, conversely, another process as withdrawing money from the bank or ATM. In this way, if a piece of paper currency (money) that should be inside a bank (or other facility) is detected again in the deposit process, then to this can be detected as an abnormal situation.

The above described tag data in the log database is stored by grouping it into the physical header value, service header value and identification number fields. The identification number is registered in the database for making retrievals (searches). In this way, a search can instantaneously be made to find out if the target identification number that was read out is already registered in that database or not. The date, time, location and process for that identification number can also be found when the search results are already stored in that log database. The location can be found from information on the reader ID, and from information relating to the location and ID reader stored by a separately specified method.

The processing that is carried out when a query is made from a terminal management server relating to tag data read by an ID-reader controlled by that server is described next. The process flow will be shown in FIG. 8.

Figure 8:
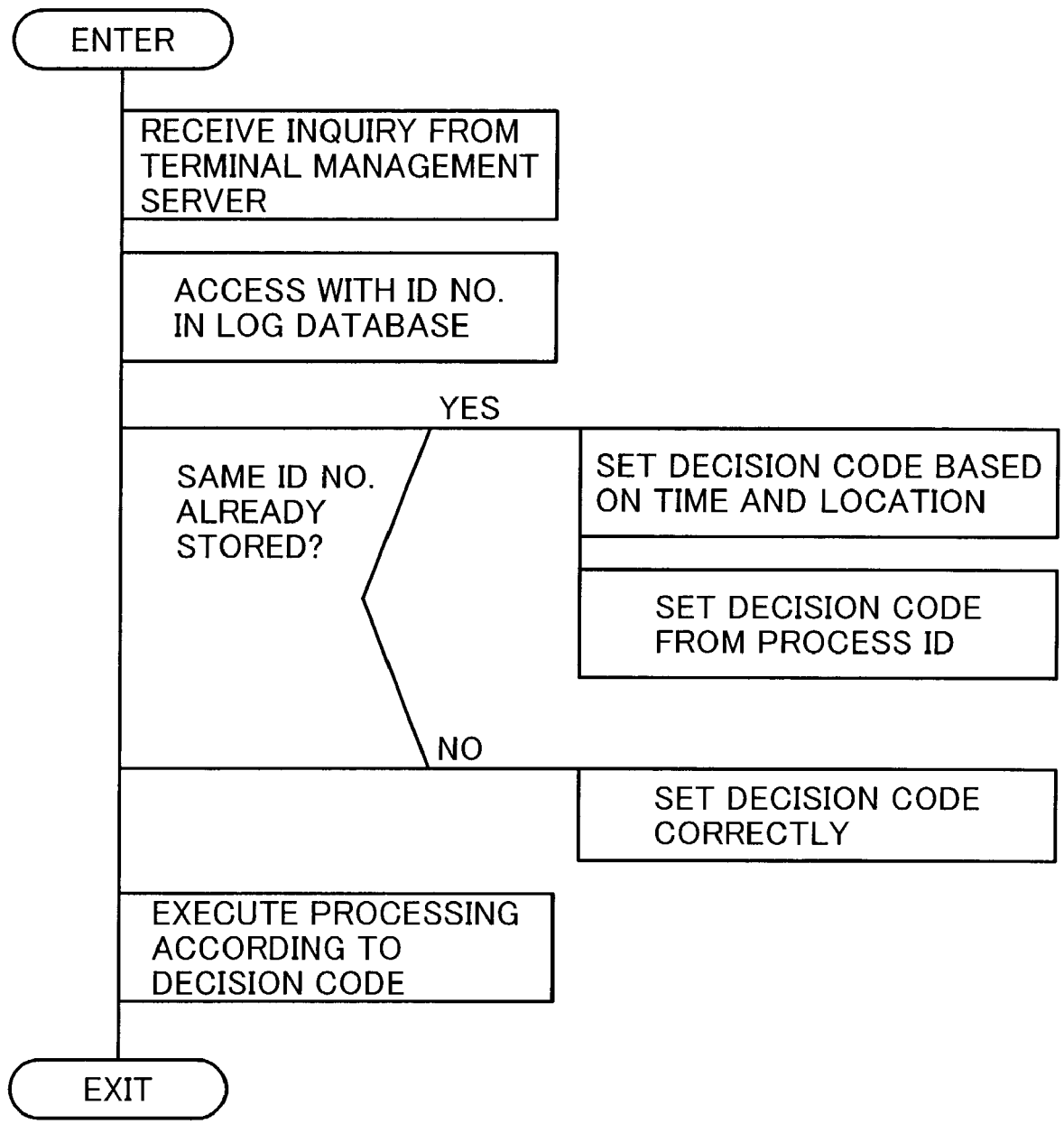
FIG. 8 is a process flow chart showing the authentication processing flow of the operation management server.

First of all, as shown in FIG. 8, a search is made for a past record of an identification number of that tag data from the log database. The flow applies to either of the following two cases:

(1) There is a record of the applicable identification number.

(2) There is no record of the applicable identification number.

In the case (2), the number at this point is likely to be genuine (normal), so the check result code is set to "normal". However, in case (1), there is already a record of the read-out number, so that the RF-ID tag might be a counterfeit. Thus, a decision is made, based on recorded information from the log database, to determine whether or not the situation might occur considering the geographic and time conditions. Because the ID reader device that read the identification number being inquired about and the ID reader device having a past record (of that number) are known, the geographic distance between these two reader devices can be estimated from position information on the readers stored in the database of the terminal management server 132 (FIG. 8). The time difference $t_1$ between the time the identification number was inquired about and the read-out time in the past record can also be determined. When multiple past records are found relating to the identification number being inquired about, the closest time from among these records is selected.

When the geographical distance is set as d, and the time difference is set as t, the probability $f$ of an abnormality is modeled beforehand as a function of d and t. The abnormal probability function $f$ (d, t) is calculated from the values of d and t obtained from the query results, and it is compared with the threshold F stored separately; and, if the calculated value of $f$ is greater than F, it is determined to be a counterfeit, and "error" is set as the result code. If $f$ is equal to F, or if $f$ is less than F, then it is determined that the merchandise item (RF-ID tag) has been moved and then read in a decision valid up until the next process ID, and the result code is set to "normal".

Here, the abnormal probability function $f$ (d, t) is first modeled as a function of the normal required time T (d) for moving the merchandise item a geographical distance d, and the actual time required t. Specifically, when t is greater than T (t>T) the abnormal probability function is a large value. In this way, modeling may be performed so that $f$ becomes $f$ (T(d), t). This time T(d) will vary according to the application provided, and it might not always be just an actual movement time but must be modeled to include time, factors such as office processing time, etc.

A decision is next made by comparing the process ID. When the process ID, at the time the ID number of the query is read, is set as p1, and the most recent past record of the process ID is p2, a decision can be made to determine whether or not a transition from p1 to p2 is logically possible by making a comparison with the process transition rules stored by a separate specified method (file 133). When it is decided that the transition is possible, the result code is set to "normal"; and, when it is decided that the shift is impossible, the result code is set to "error". For example, when a merchandise item not yet shipped from the factory is read out as a process ID No. 50 (signifying "sold"), then this is judged to be an impossible transition between processes, and the merchandise item is regarded as counterfeit. In applications using paper currency (or bank notes), this currency can be determined as money belonging within the bank (or ATM) or as money outside the bank. In other words, if the most recent process ID record shows that, even though paper currency was deposited through an ATM, the RF-ID tag was again read out at a later date and at a separate location, then an abnormal situation, such as counterfeiting, is judged to have occurred, since a single object cannot physically be in two different locations at the same time.

The system operation server 103 receives the result code set by the above-described processing and executes processing according to that result code. For example, when an error code has been set, the applicable identification number and the information on the RF-ID tag determined to be an error are stored in the blacklist database 131 (FIG. 7) created according to the designated specifications. More specifically, the tag data, date, time, ID reader device, operator ID and process ID are stored in the blacklist database. During authentication processing, when the system has this type of blacklist database, the operation management server, first of all, accesses the blacklist database 131 and decides whether or not the identification number being inquired about (not listed in FIG. 8) is registered in that blacklist database.

In the system of the present invention, after the identification number of the RF-ID tag is read-out by radio from the RF-ID reader 20, the terminal management server decides whether or not the number is a "valid" number. If it is a valid number, an inquiry is made to the operation management server to determine if the valid number was previously read out in the past. If the number was previously read out, then when, where and in what process that number was read out is verified and an overall decision is made to determine whether the identification number (and therefore the RF-ID tag) of the inquiry is genuine or not. If the identification number in question was not valid or is judged as not genuine, based on the past read-out log (history), then an alarm message is promptly forwarded to the related office in compliance with the specified procedure. This identification number is also then registered in the blacklist database. The operator in that department or an office worker can then take appropriate action based on these alarms or warnings.

The present invention has been described on the basis of an exemplary embodiment, however the present invention also can be implemented by variations of this system or method without departing from the scope or spirit of the present invention. For example, in the above description, it was indicated that the operation management server is separately managed by the company utilizing the RF-ID tag, however, this task may be entrusted to an RF-ID tag management organization. Also, in the above description, it was indicated that the decoding of the error correction code during RF-ID tag read-out is performed by the terminal management server, however, the decoding may be performed internally in the ID reader 20.

The present invention is therefore capable of minimizing the counterfeiting of RF-ID tags and losses due to counterfeit RF-ID tags, of enhancing the reliability of RF-ID tag read-out and of improving the reliability of the overall RF-ID tag system.

What is claimed is:

1. An RF-ID (Radio Frequency Identification) tag management method for authenticating an RF-ID tag attached to merchandise, comprising:
   reading tag data from the RF-ID tag by a first ID-reader, and reporting the tag data to a system operation server with a first process ID assigned to the first ID-reader;
   registering the first process ID as being related to an identification number of the tag data in a log database on the system operation server;
   searching the log database for a second process ID which is the most recently recorded process ID as being related to the identification number; and
   detecting a counterfeit RF-ID tag by determining whether a transition from a second process indicated by the second process ID to a first process indicated by the first process ID is possible as compared with process transition rules which are used to determine whether transitions between processes performed in an overall business system are possible or not,
   wherein each of the first process and the second process indicates one of the processes in the overall business system, and
   wherein process IDs, including the first process ID and the second process ID, are numbers indicating which of the processes in the overall business system have been performed on the merchandise.

2. The RF-ID tag management method according to claim 1, further comprising:
   determining whether or not a time difference between a first time when the first ID-reader read out the tag data and a second time when a second ID-reader read out the tag data is greater than normal required time for moving from the second geographic position where the second ID-reader read out the tag data to a first geographic position where the first ID-reader read out the tag data.

3. The RF-ID tag management method according to claim 1,
   wherein said tag data comprises at least a physical header, a service header and service data, and said service data is an integer of a limited fixed length indicating an identification number for said service, which is generated as a pseudo-random number.

4. The RF-ID tag management method according to claim 1, wherein said tag data contains redundant data for error code correction, and error correction code decoding is performed on tag data read-out results, and the specified error correction is performed when an error is correctable.

5. The RF-ID tag management method according to claim 1,
   wherein the processes indicated by the first process ID and the second process ID are any one of product inspection, factory shipment, wholesaler shipment, retailer shipment, sale, merchandise return and maintenance, and
   wherein the process transition rules determine that transitions from the product inspection to the factory shipment, from the factory shipment to the wholesaler shipment, from the wholesaler shipment to retailer shipment, from the retailer shipment to the sale, from the sale to the merchandise return, and from the sale to the maintenance are possible.

6. An RF-ID (Radio Frequency Identification) tag management method for authenticating a RF-ID tag attached to paper currency, comprising:
   reading tag data from the RF-ID tag by a first ID-reader and reporting the tag data to a system operation server with a first process ID assigned to the first ID-reader;
   registering the first process ID as being related to an identification number of the tag data in a log database on the system operation server;
   searching the log database for a second process ID which is the most recently recorded process ID as being related to the identification number for the tag data; and
   detecting a counterfeit RF-ID tag by determining whether a transition from a second process indicated by the second process ID to a first process indicated by the first process ID is possible as compared with process transition rules which are used to determine whether transitions between processes performed in an overall business system are possible or not,
   wherein each of the first process and the second process indicates one of the processes in the overall business system, and
   wherein the process IDs, including the first process ID and the second process ID, are numbers indicating which of the processes in the overall business system have been performed on the merchandise.

7. The RF-ID tag management method according to claim 6,
   wherein the process indicated by the first process ID and the second process ID is any one of depositing money in a bank or ATM (Automated Teller Machine) and withdrawing money from the bank or ATM.

8. A method for detecting a counterfeit of an RF-ID (Radio Frequency Identification) tag comprising:
   reading an identification number from an RF-ID tag by a first reader;
   reporting the identification number with a first process ID from the first reader to a log database in a system operation server;
   registering the first process ID, a read-out date and a read-out time as being related to the identification number in the log database;
   reading an identification number from an RF-ID tag by a second reader;
   reporting the identification number with a second process ID from the second reader to a log database in the system operation server; and
   retrieving the first process ID with the identification number from the log database and detecting a counterfeit RF-ID tag by determining whether a transition from a first process indicated by the first process ID to a second process indicated by the second process ID is possible as compared with process transition rules which are used to determine whether transitions between processes performed in an overall business system are possible or not,
   wherein each of the first process and the second process indicates one of processes in the overall business system, and
   wherein process IDs, including the first process ID and the second process ID, are numbers indicating which of the processes in the overall business system have been performed on the merchandise.

9. The method according to claim 8,
   wherein each of the processes indicated by the first process ID and the second process ID is either one of product inspection, factory shipment, wholesaler shipment, retailer shipment, sale, merchandise return and maintenance, and
   wherein the process transition rules determine that transitions from the product inspection to the factory shipment, from the factory shipment to the wholesaler shipment, from the wholesaler shipment to retailer shipment, from the retailer shipment to the sale, from the sale to the merchandise return, and from the sale to the maintenance are possible.

10. The method according to claim 8,
    wherein each of the processes indicated by the first process ID and the second process ID is either one of depositing money in a bank or ATM (Automated Teller Machine) and withdrawing money from the bank or ATM.

* * * * *